United States Patent
Yokozeki

[19]
[11] Patent Number: 6,128,066
[45] Date of Patent: Oct. 3, 2000

[54] METHOD OF MANUFACTURING LIQUID CRYSTAL PANELS WITH SIMULTANEOUSLY EVACUATING AND PRESSURIZING AND MANUFACTURING APPARATUS

[75] Inventor: Makoto Yokozeki, Uji, Japan

[73] Assignee: Matsushita Electric Industrial Co., Ltd., Japan

[21] Appl. No.: 09/152,295

[22] Filed: Sep. 14, 1998

[30] Foreign Application Priority Data

Sep. 19, 1997 [JP] Japan ................................. 9-254006

[51] Int. Cl.[7] .............................. G02F 1/13; G02F 1/1339
[52] U.S. Cl. ................................. 349/187; 349/190; 349/1
[58] Field of Search ................................. 349/1, 190, 187

[56] References Cited

U.S. PATENT DOCUMENTS

| 5,263,888 | 11/1993 | Ishihara et al. | 445/25 |
|---|---|---|---|
| 5,872,608 | 2/1999 | Inoue et al. | 349/86 |
| 5,898,041 | 4/1999 | Yamada et al. | 522/81 |
| 5,959,712 | 9/1999 | Morii et al. | 349/190 |
| 5,978,065 | 11/1999 | Kawasumi et al. | 349/186 |
| 5,989,088 | 11/1999 | Hasegawa et al. | 445/24 |

FOREIGN PATENT DOCUMENTS 10-3083   1/1998   Japan .

Primary Examiner—Kenneth Parker
Assistant Examiner—Mike Qi
Attorney, Agent, or Firm—Parkhurst & Wendel, L.L.P.

[57] ABSTRACT

A cell 4 obtained by putting together a pair of substrates 1 and 2 with a sealant interposed is laid on a laying stage inside a housing unit 30 which is roughly of a shape of frame of a box, pressurized by a pressure plate 43 by applying compressed air pressure to an elastic plate 41 from the opposite side while the cell 4 is being held, and as they are being pressurized, evacuation is performed through an opening of the sealant 3, and the whole housing unit is gradually heated inside a thermostatic chamber while maintaining this condition, thereby curing the sealant without causing any deformation of substrates, distortion or peeling of the sealant, or change in the preset gap or miss-alignment between the substrates.

5 Claims, 10 Drawing Sheets

METHOD OF MANUFACTURING LIQUID CRYSTAL PANELS WITH SIMULTANEOUSLY EVACUATING AND PRESSURIZING AND MANUFACTURING APPARATUS

FIELD OF THE INVENTION

The present invention relates to methods of manufacturing liquid crystal panels and an apparatus for manufacture thereof, in particular the methods and apparatuses for joining a pair of substrates with a sealant interposed within a predetermined gap, and for curing the sealant.

BACKGROUND OF THE INVENTION

As illustrated in FIG. 6, liquid crystal panels are fabricated by orientation-layer printing on and rubbing each of a pair of substrates 1 and 2 (a glass substrate on which array chips have been formed and an opposing glass substrate on which a color filter has been formed), followed by processing for alignment, putting together the substrates 1 and 2 with a sealant 3 there between forming a cell 4, pouring liquid crystal through an opening 5 of the sealant in between the substrates 1 and 2, and sealing in the opening 5. In FIG. 6, a temporary fixer 6 temporarily fixes the substrates 1 and 2.

Conventional methods of curing the sealant while maintaining the gap between the substrates 1 and 2 within the desired range includes a exist vacuum pack method that employs a vacuum pack, a heated-plate pressurizing method that employs a heated plate for pressurizing, and a pressurizing-while-evacuating method.

As illustrated in FIG. 7, the vacuum pack method is performed by inserting a cell 4 obtained by aligning substrates 1 and 2 and putting them together with a sealant interposed into a bag for vacuum packing, and evacuating by putting the whole bag 7 in a vacuum chamber. After a desired degree of vacuum has been reached, the bag 7 is hermetically sealed by thermally fusing an opening 7a (the dashed and dotted line of FIG. 7) restoring, atmospheric pressure to make it a pressurized state, and placing the entire bag 7 into a furnace, where the entire cell 4 is gradually heated to cure the sealant 3.

In the heated-plate pressurizing method, as illustrated in FIG. 8 and FIG. 9, a cell 4 obtained by aligning and joining substrates 1 and 2 with a sealant 3 is subsequently interposed between multi-layered heated plates 11 that vertically slide up and down and are pressed by a pressing apparatus (not shown in the drawing) with cell 4 held between the heated plates 11, to raise the temperature of cell 4 by means of a heating plate (not shown in the drawing) attached to heated-plates 11 via heated-plates 11 and curing sealant 3.

In the vacuum pressurization method, as illustrated in FIG. 10, a pair of upper and lower housing frames 17 and 18 obtained by fusing metal films 16 in the middle of a pair of approximately square outer frames 15 have an open central portion that is closely pressed from the top and the bottom with an O-ring interposed, the temperature of cell 4 is raised as it is inserted between the metal films 16, and the space between the metal films 16 of housing frames 17 and 18 is evacuated, thereby curing sealant 3. By raising the temperature, in order to avoid non-uniform heating of cell 4 because of formation of wrinkles on metal films 16, the temperature of outer frame 15 is chosen to be higher than the temperature of the metal films 16 and a tension is applied to the metal films 16. In FIG. 10, is a heater 20 installed inside outer frame 15 and a heater 21 is provided on the outside surface of metal films 16.

However, each of the conventional methods of manufacturing liquid crystal panels suffer the problems as described below.

In the vacuum pack method, as the cross sectional area of opening 5 of sealant of cell 4 is extremely small, e.g., 5 $\mu m \times 5$ mm, the external pressure of cell 4 inside bag 7 rapidly decreases toward vacuum during evacuation, and at the same time the decrease in air pressure between substrates 1 and 2 is slower that of the outside because the air between substrates 1 and 2 is not rapidly exhausted, thus resulting in a higher pressure of inside cell 4 than outside of cell 4, and the swelling deformation of substrates 1 and 2 as shown in FIG. 11. Also, a volatile component generated inside cell 4 tends to remain inside cell 4, which also causes swelling deformation of substrates 1 and 2.

Consequently, the volume between substrates 1 and 2 is increased, causing further delay in evacuation. Also, deformation of substrates 1 and 2 as described above has tended to cause either deformation or peeling of sealant 3 and or temporary fixer 6, change the preset gap or the medistance of miss-alignment between substrates 1 and 2. Also, as cell 4 is not constrained when restoring the atmospheric pressure by opening bag 7, similar problems tend to be caused by the deformation of substrates 1 and 2 resulting from the difference in the modulus of elasticity due to the difference in construction of substrates 1 and 2 or from the difference in the pressure exerted on substrates 1 and 2.

Also, as the curing temperature of sealant 3 approaches to the heat-resistance temperature of bag 7, it is not always possible to raise the temperature to a value high enough to cure sealant 3, thus resulting in an insufficient curing of sealant 3 or deteriorating the alignment accuracy due to softening of temporary fixer 6.

Furthermore, there is an additional problem of not being able to maintain the gap between substrates 1 and 2 at a required distance due to an increase in the internal pressure of cell 4 which is caused by the volatile component generated inside cell 4.

In the heated-plate pressurizing method, because non-uniform thermal expansion is caused on each of substrates 1 and 2, resulting in deterioration in the accuracy of alignment, it is difficult to satisfactorily maintain the accuracy of temperature distribution on heated plates 11. Also, as the method is so configured as to press a pressing apparatus on each of substrates 1 and 2 sandwiched between heating plates 11, it suffers from problems of low processing capabilities when the entire apparatus is large scale.

In the pressurizing-while-evacuating method, although cell 4 is heated with a heater 20 via metal films 16 it cause an effect similar to directly heating cell 4 with heater 20, because the metal films 16 are thin and have a high thermal conductivity. As a result, non-uniformity of the heating temperature of heater 20 causes non-uniformity of thermal expansion on each of substrates 1 and 2, a problem deteriorating the accuracy of alignment This is similar to the heated-plate method. Also, as metal films 16 are extended under tension to the limit of their elasticity, the weld between metal films 16 and outer frame 15 fatigues, sometimes failing to pressurize as metal films 16 are broken at that section. Also, when metal films 16 are sometimes damaged and broken at the corner of cell 4 when they are pressurized by the atmospheric pressure from the outside surface toward cell 4. In order to prevent such a situation, it is often necessary to include metal frame adjusted to the external dimensions and thickness of cell 4 and place it over cell 4, which hampers efficiency. It is also necessary to incorporate thermocouples to control heaters 20 and 21, and to make wiring and piping connections for heaters 20, 21 and the thermocouples together for evacuation. When assembling a unit with a plurality of housing frames 17 and 18, the work of making these wiring and piping connections increasing indifficulty and the cost of the equipment is increased .

SUMMARY OF THE INVENTION

An object of the present invention is to provide manufacturing methods and manufacturing apparatus for liquid crystal panels that can satisfactorily cure a sealant without any deformation of substrates, warping or peeling of the sealant, change the preset gap and prevent mis-alignment between substrates, without calling for a large-scale apparatus and resultant high cost of such equipment.

In order to address the above-described problems, the present invention provides a method of manufacturing liquid crystal panels in which liquid crystal panels are fabricated by forming a cell by joining a pair of substrates with a sealant interposed and pouring liquid crystal through an opening of the sealant to a space between the substrates, wherein the substrates with the sealant interposed are held and pressurized from both sides; during pressurization, they are evacuated through the opening of the sealant between the substrates, and the sealant is cured by heating the entire housing unit in a thermostatic chamber This provides manufacturing method of liquid crystal panels in which the sealant can be satisfactorily cured without any deformation of the substrates and or distortion or peeling of the sealant, without calling for a large-scale apparatus and increased.

The manufacturing apparatus of liquid crystal panels of the present invention has a housing unit which is roughly of the shape of a frame of a box of which the upper lid is free to open and close, and is provided with a sealing section to hermetically seal the inside of the housing unit; a laying surface on which a cell prepared by putting together substrates with a sealant interposed is to be placed; an elastic holding section which is disposed opposite to the laying surface and which holds the cell against the laying surface with a force of swell produced by the compressed air pressure; and an exhaust passageway leading to the inside of the housing unit and connected to the evacuation passageway connected to an external evacuating apparatus, thus being able to satisfactorily cure the sealant.

In an embodiment of the present invention, is a method of manufacturing liquid crystal panels comprises forming a cell obtained by putting together a pair of substrates with a sealant (aka sealing member) interposed; pouring through an opening of the sealant liquid crystal to a space between the substrates, wherein the substrates are held from both sides and pressurized when joined with a sealant there-between, and evacuation through the opening of the sealant between the substrates while the cell is kept under a compressed air pressure; heating the whole cell gradually as it is within a variable temperature chamber to cure the sealant.

In the above-described method, as the evacuation is carried out through the opening of the sealant between the substrates while they are held from both sides under pressure, the air and volatile component between the substrates can be quickly exhausted to outside, making it possible to satisfactorily cure the sealant without causing any deformation of the substrates, distortion or peeling of the sealant, or change in the preset gap or miss-alignment between the substrates. Also, during heating, as temperature of the entire cell is raised gradually inside a thermostatic chamber, it is possible to heat the entire cell under stable conditions, thereby preventing non-uniformity of thermal expansion of the substrates and/or deterioration of the alignment accuracy.

In another embodiment, the apparatus for manufacture of liquid crystal panels comprises a housing unit roughly of a shape of frame like a box and of which the upper lid is free to open and close; a sealing section to hermetically seal the inside of the housing unit; a laying surface to lay a cell formed by joined a pair of substrates with a sealant interposed; an elastic holding section disposed opposite to the laying surface and which holds the cell against the laying surface with a swell force produced by pressurization means of compressed air pressure; and an exhaust passageway leading to the inside of the housing unit and connected to the evacuation passageway connected to an external evacuating apparatus. With this construction, it is possible to satisfactorily cure the sealant with a relatively inexpensive equipment cost.

In yet another embodiment, the present invention is an apparatus ??? of liquid crystal panels comprises the elastic holding section being arranged to pressurize the panel surface via a pressure plate. With this construction, part of elastic holding section is also regulated and maintained on a flat plane.

In still another embodiment, the present invention provides a thermostatic chamber to gradually increase or decrease the temperature of a housing unit, whereby the entire housing unit can be uniformly heated or cooled thus providing a correct plane without causing any warp or distortion in the laying stage or pressure plate.

In still another embodiment, the present invention provides a multistage shelf inside the thermostatic chamber to allow a plurality of housing units at the same time. With this construction, it is possible to uniformly cure sealants of a number of housing units housed in the thermostatic chamber, thus increasing the productivity.

DETAILED DESCRIPTION OF THE INVENTION

Figure 1:
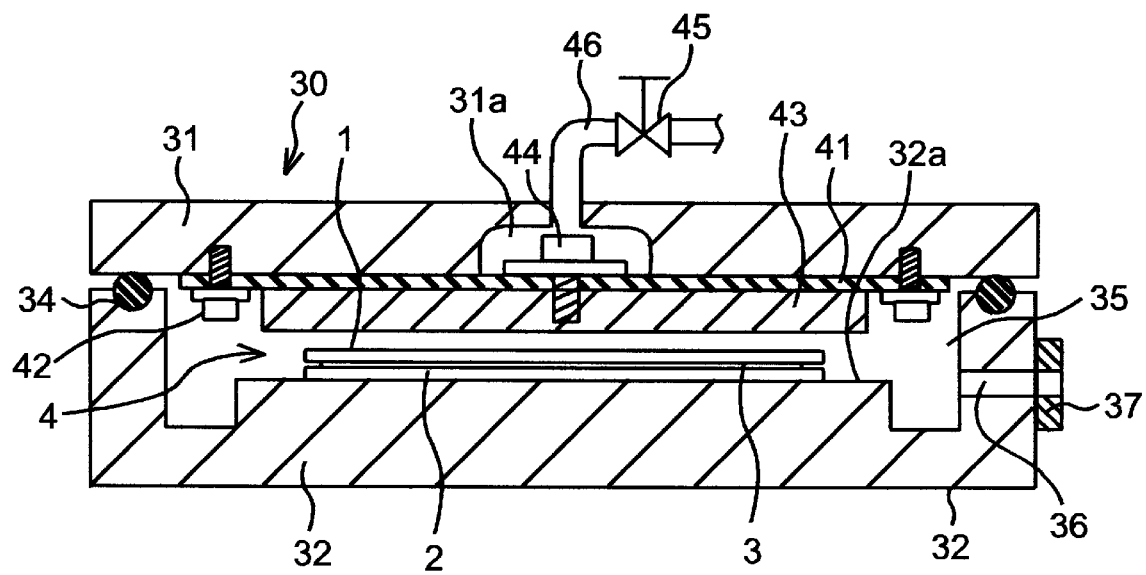
FIG. 1 is a vertical cross sectional view of a housing unit of a manufacturing apparatus of liquid crystal panels in accordance with an embodiment of the present invention.
Figure 2:
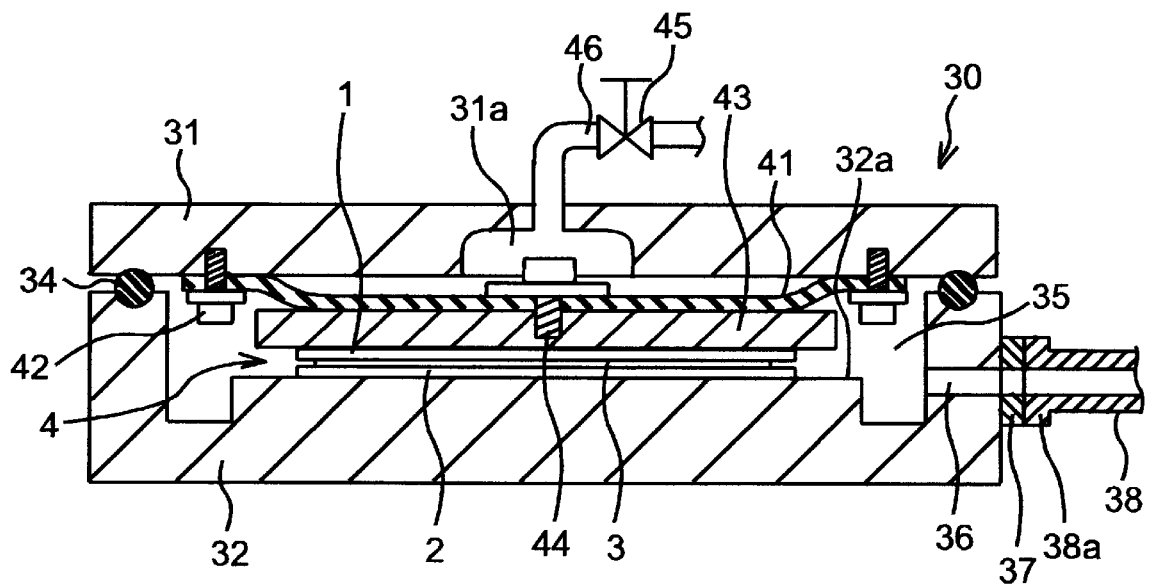
FIG. 2 is a vertical cross sectional view of the housing unit showing pressurizing process.

In the following, an embodiment of the present invention will be described referring to FIG. 1 to FIG. 5. As the construction of the liquid crystal panels (cells) themselves are the same as the prior art, the same reference numerals are attached to the elements having the same function and their explanation is omitted.

In FIGS. 1 to 4, a housing unit 30 roughly of a shape of frame of a box of which upper lid 31 is free to open and close via a bracket 33 (FIG. 4) relative to the main unit 32. An 0-ring 34 is used as a sealing means to hermetically seal inside of the housing unit 30 is provided near the outer periphery of the joining surface between main unit 32 and upper lid 31. Also, inside housing unit 30 is formed a housing chamber 35 to house a cell 4 obtained by putting together substrates 1 and 2 with a sealant 3 interposed. On the top surface of the central portion of main unit 32 is provided a laying surface 32a to lay cell 4 on. Also, an exhaust passageway 36 leading to the outside is provided sideways on main unit 32. An elastic sealing material 37 is fixed on the outer surface of exhaust passageway 36, and pressed onto elastic sealing material 37 is an evacuation passageway 38 (FIG. 3) that is provided with a vacuum pad 38a on the tip to allow connection to housing chamber 35 via exhaust passageway 36.

On the bottom surface of upper lid 31 is provided a flat elastic plate 41 such as a rubber plate, the periphery of which is fastened to the bottom surface of upper lid 31 by means of bolts 42. Also, on the bottom surface of elastic plate 41 is provided a relatively hard and flat pressure plate 43 by bolt 44. Furthermore, a pressurizing chamber 31a through which compressed air for pressurization is to be supplied is formed on the bottom surface of upper lid 31 facing elastic plate 41. A compressed air supply passageway 46 provided with valve 45 is connected to the pressurizing chamber 31a from the outside.

Figure 3:
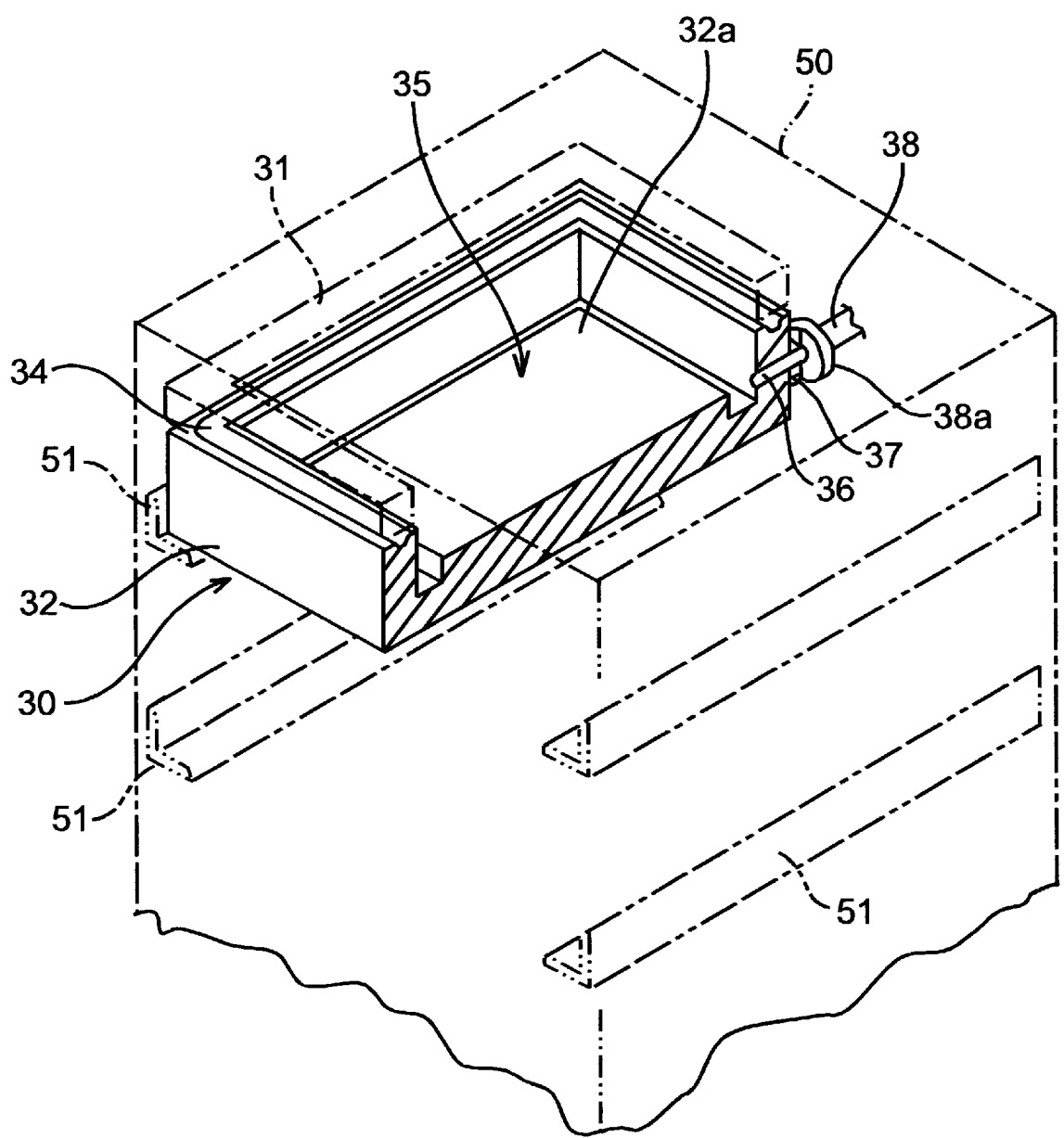
FIG. 3 is a partially cut-out perspective view of the manufacturing apparatus of liquid crystal panels.

FIG. 3 shows a thermostatic chamber so to enclose housing unit 30. The chamber is provided with a plurality of shelves 51 on each of which housing unit 30 can be placed.

Figure 4A:
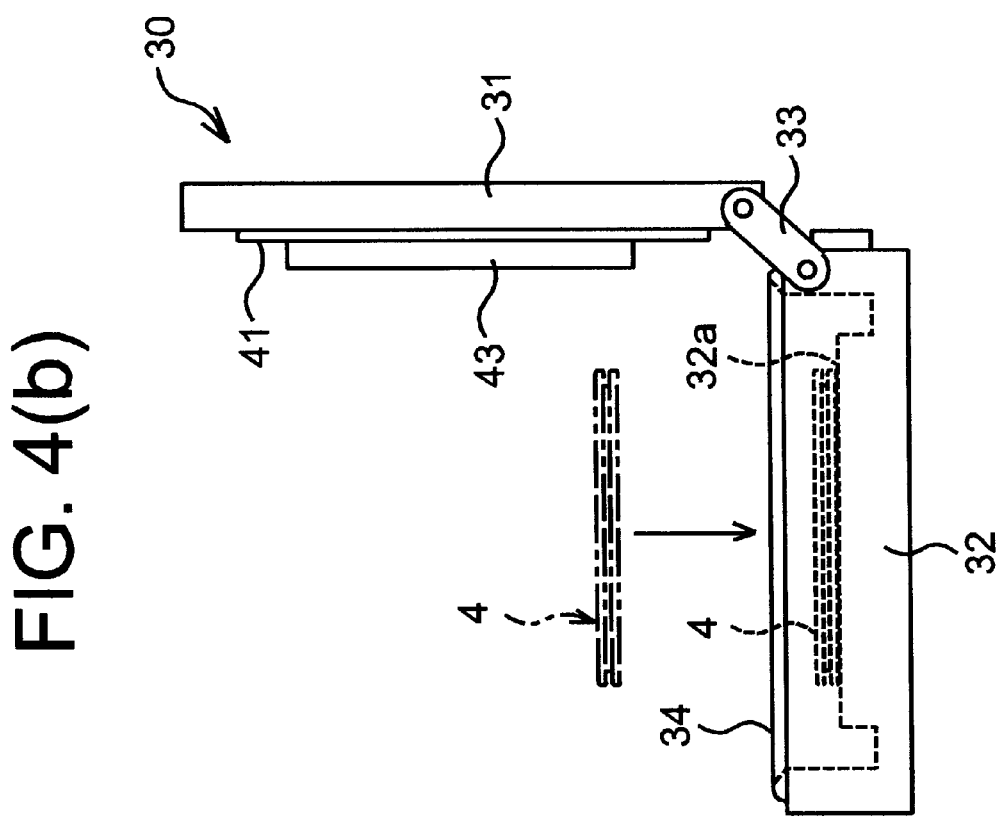
FIG. 4(a) and (b) are side views of a housing unit to illustrate respective processes of manufacturing liquid crystal panels.
Figure 4B:
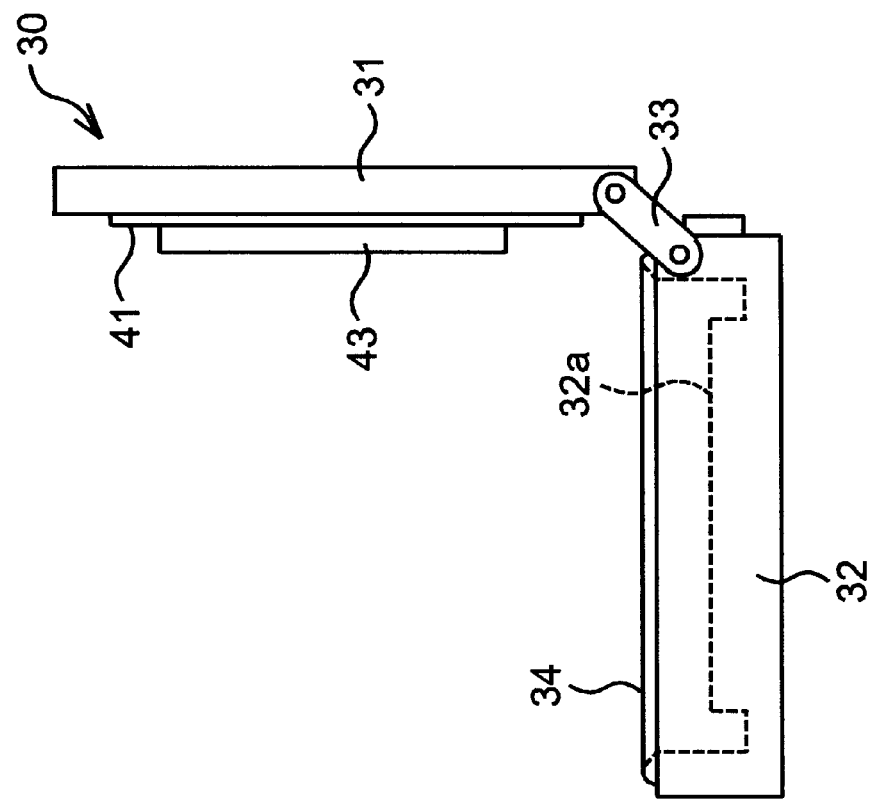
Figure 5:
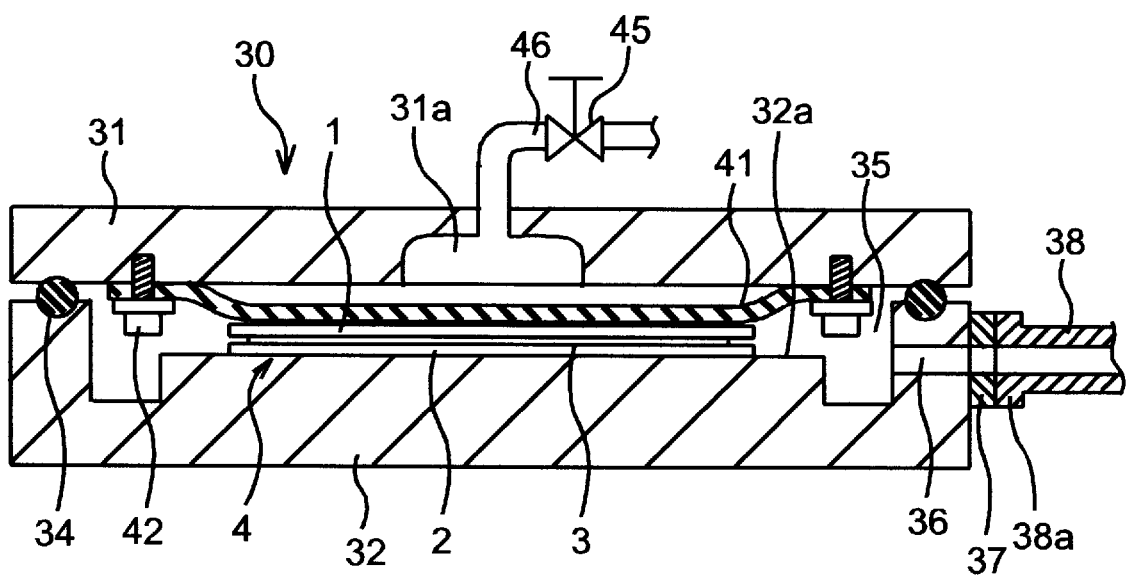
FIG. 5 is a vertical cross sectional view of a housing unit of a manufacturing apparatus of liquid crystal panels in accordance with another embodiment of the present invention.

Cell 4 is formed by joining a pair of substrates 1 and 2 with sealant 3 interposed, the cell is housed inside housing unit 30 and is laid on laying surface 32a of main unit 32 as shown in FIGS. 4(a) and 4(b). As shown in FIG. 1, when upper lid 31 is closed, housing chamber 35 inside housing unit 30 is hermetically sealed by means of an O-ring 34. Housing unit 30 is housed on shelf 51 of thermostatic chamber 50, and compressed air supply passageway 46 and evacuation passageway 38 are connected to each housing unit 30.

Subsequently, before the evacuation is started, compressed air is introduced to pressurizing chamber 31a through air supply passageway 46. As a result, elastic plate 41 swells downward, and cell 4 is pressurized on both sides of substrates 1 and 2 by pressure plate 43 that is provided on elastic plate 41 in a posture as they are held against laying surface 32a.

Figure 6:
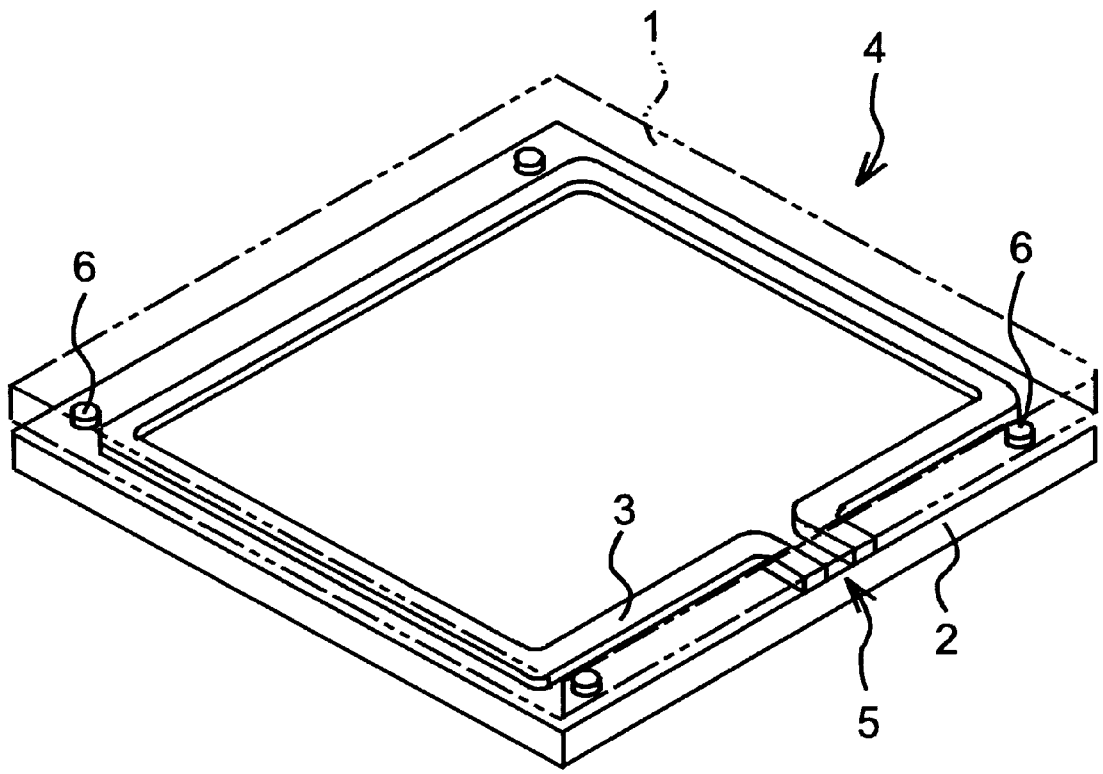
FIG. 6 is a perspective view of a cell.
Figure 7:
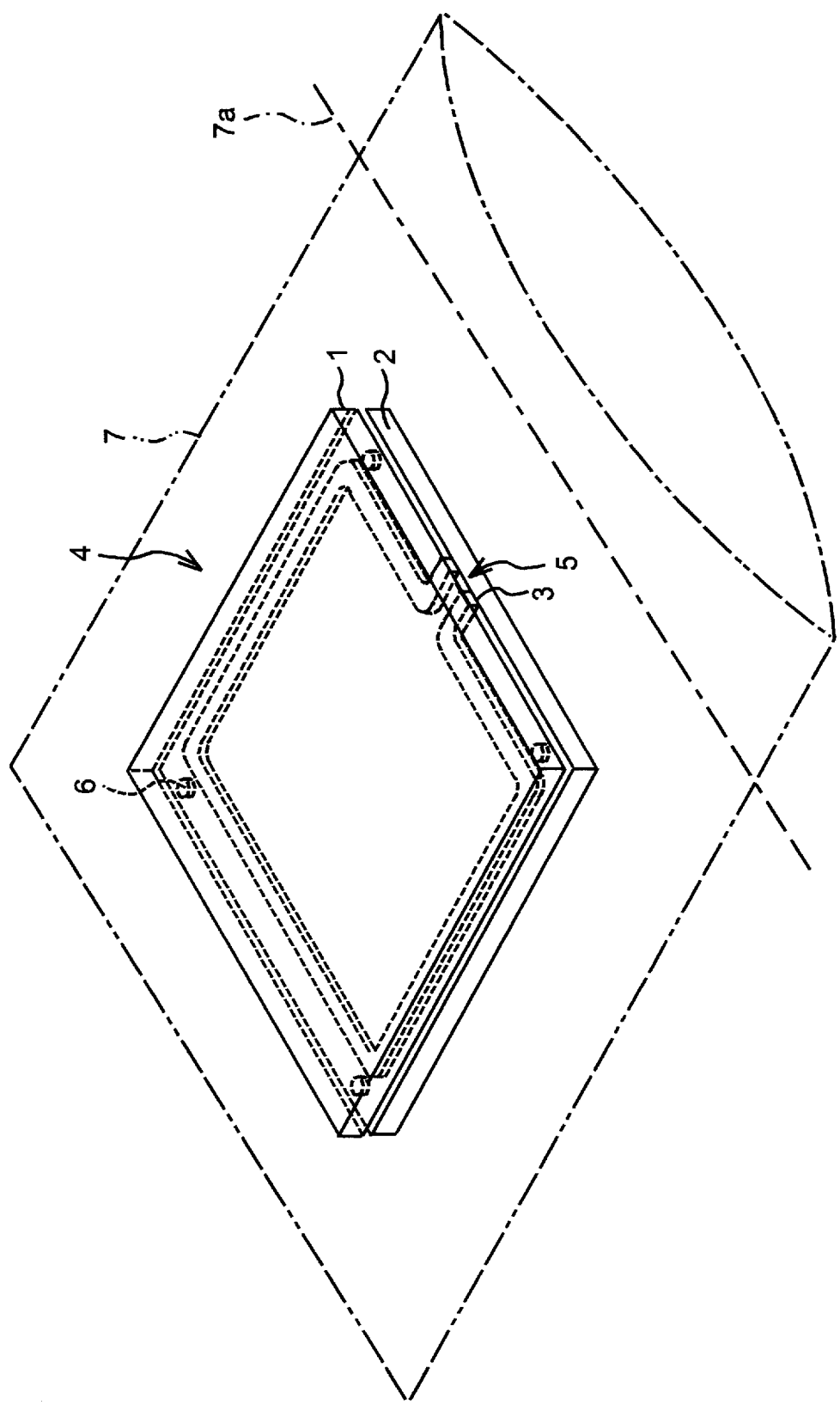
FIG. 7 is a perspective view to illustrate the vacuum pack method which is one of the conventional methods of curing sealant.
Figure 8:
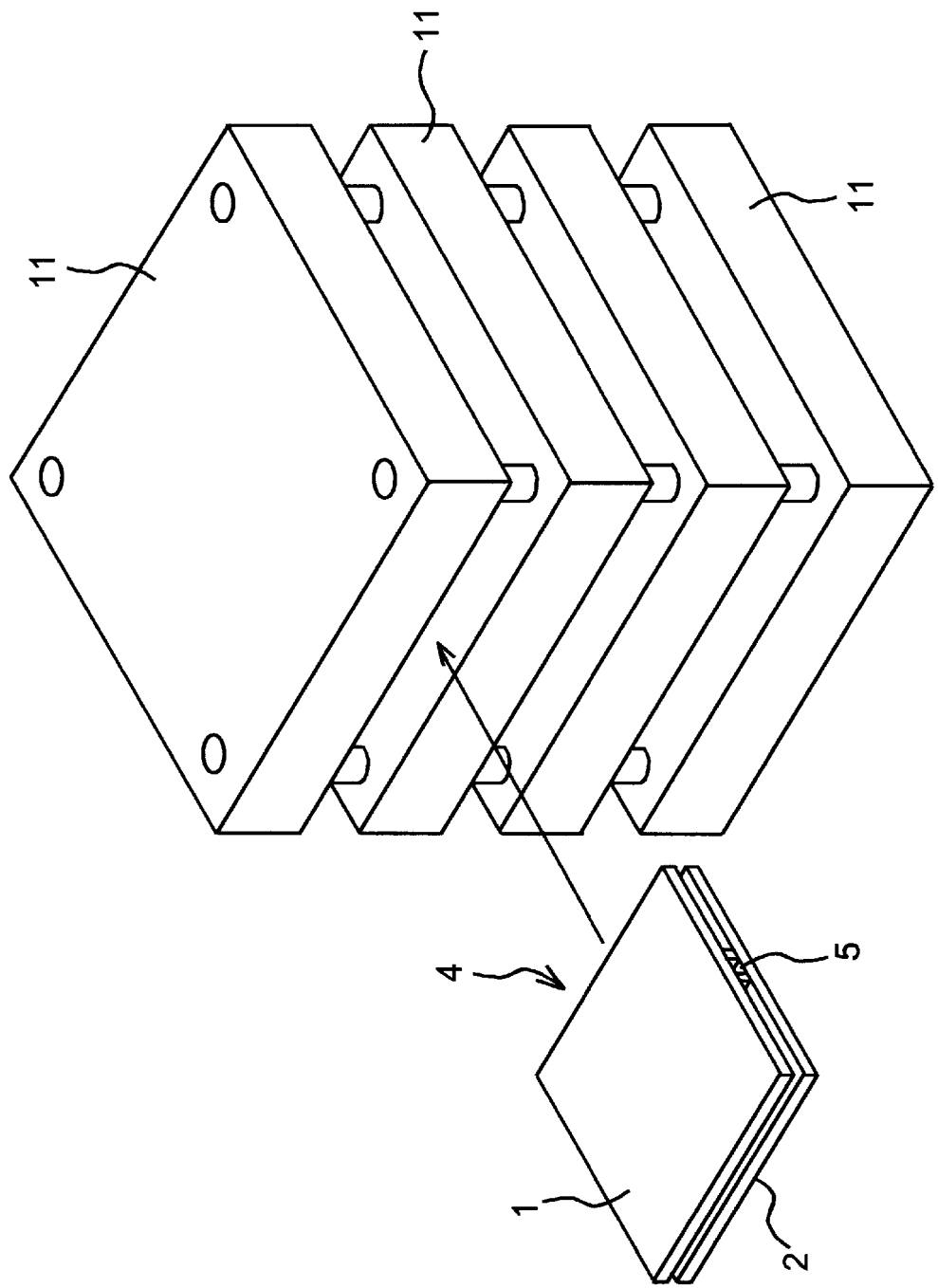
FIG. 8 is a perspective view to illustrate the heated-plate pressurizing method which is one of the conventional methods of curing sealant.
Figure 9:
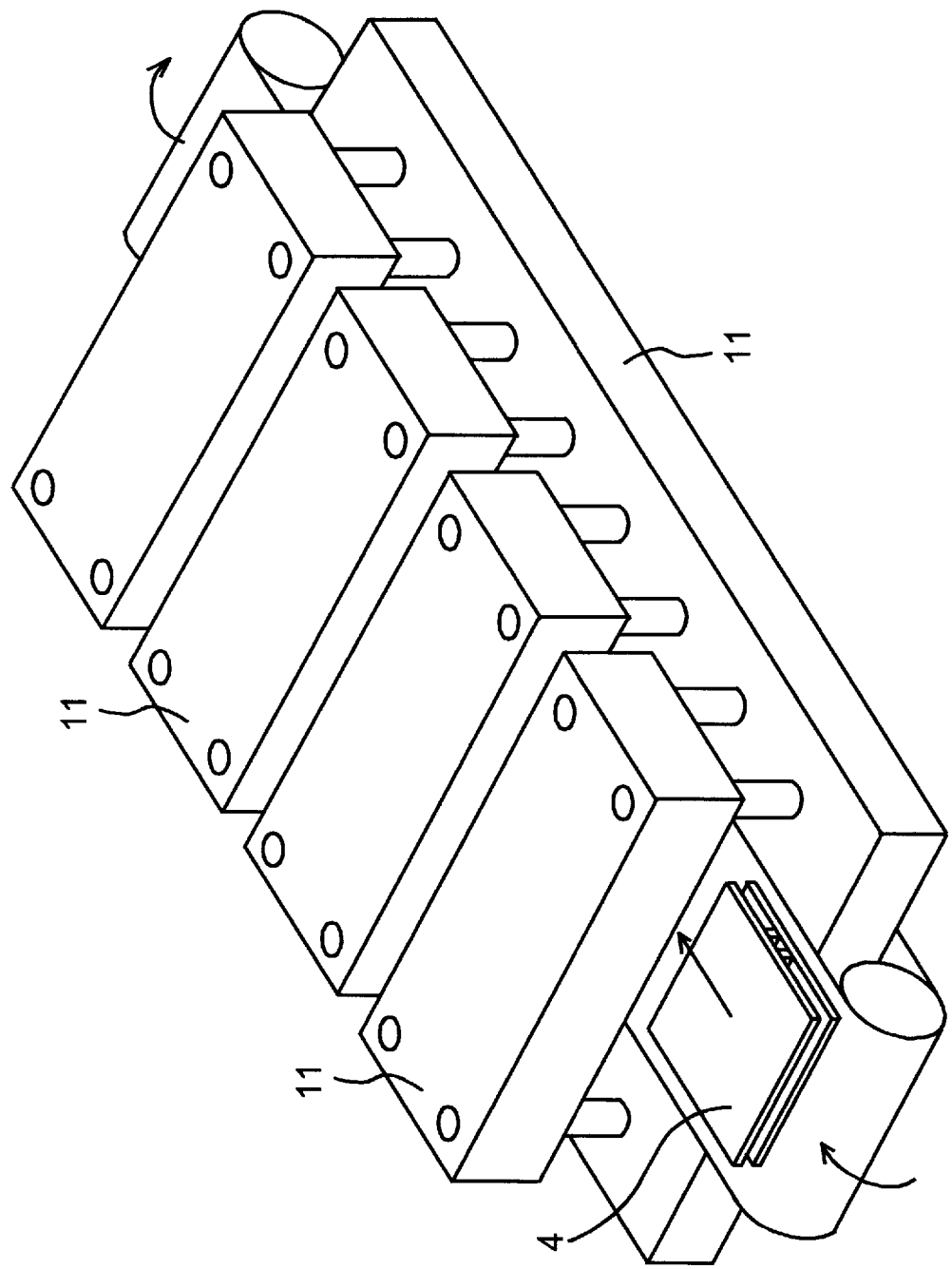
FIG. 9 is a perspective view to illustrate another heated-plate pressurizing method which is one of the conventional methods of curing sealant.
Figure 10:
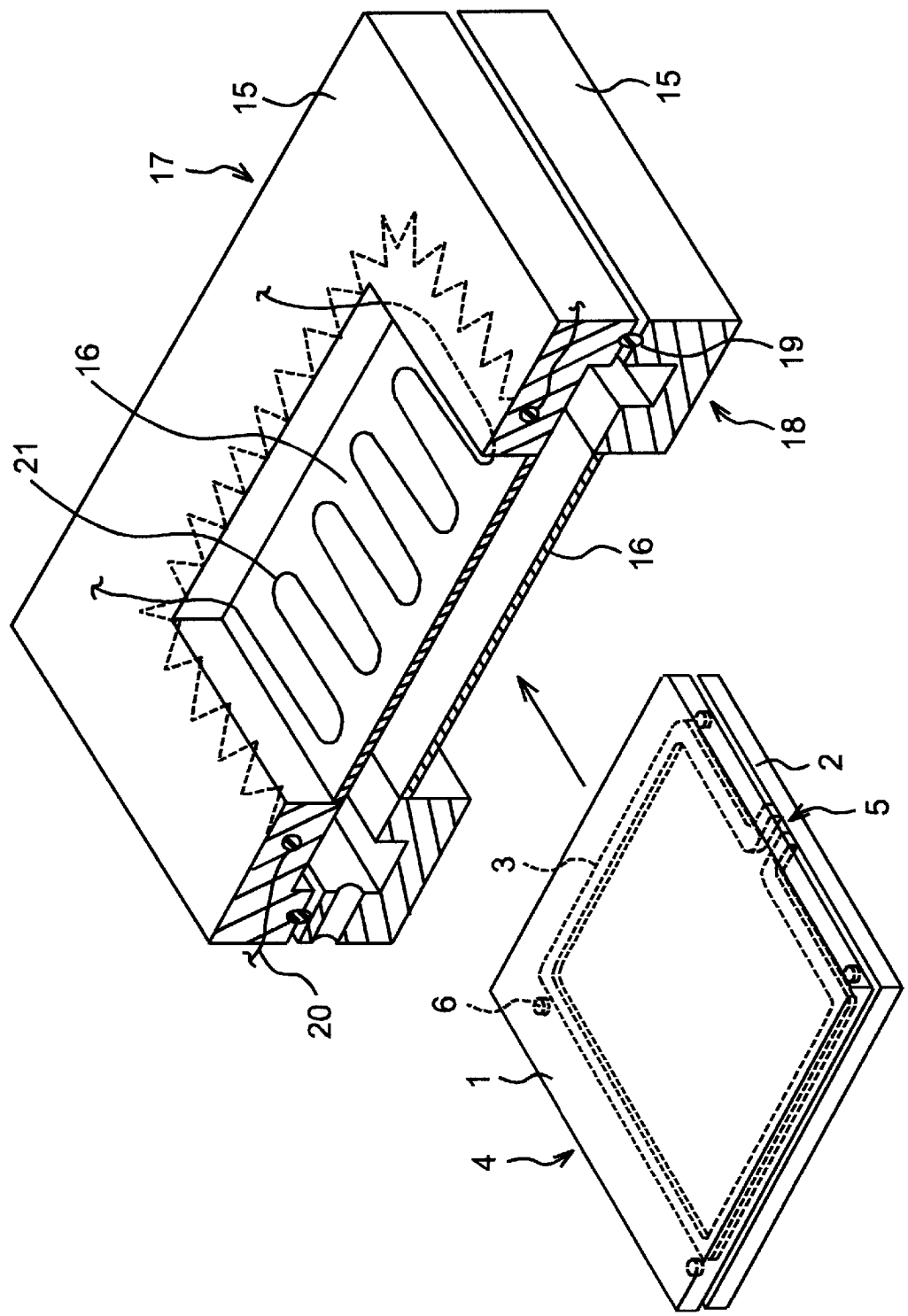
FIG. 10 is a cross sectional perspective view to illustrate the vacuum pressurization method which is one of the conventional methods of curing sealant.
Figure 11:
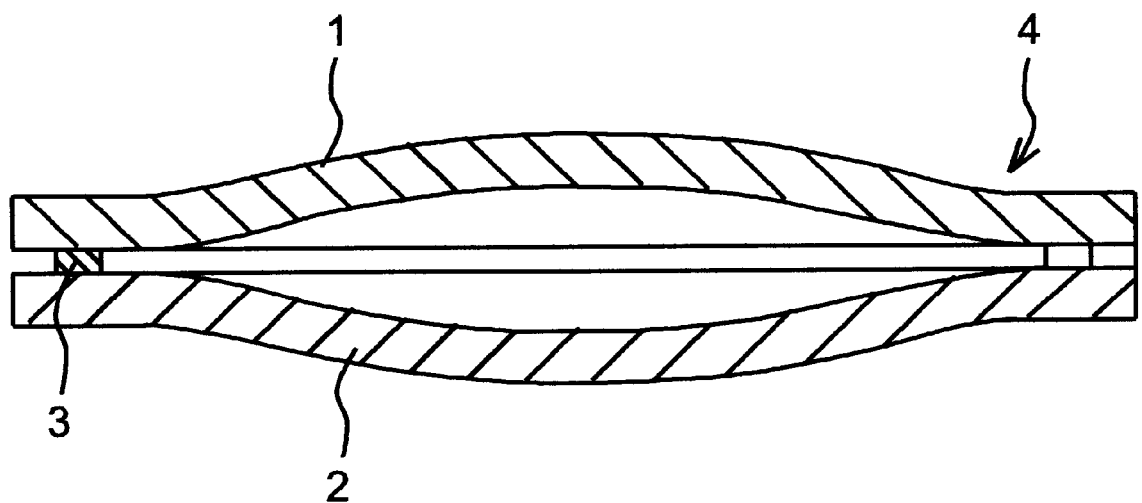
FIG. 11 is a vertical cross sectional view to illustrate problems in the conventional methods of curing sealant.

Next, under this pressurized condition, the inside of housing chamber 35 is evacuated through an evacuation passageway 38, and the air in the space enclosed by the sealant 3 between substrates 1 and 2 is also sucked through an opening 5 (FIG. 6) and exhausted. During this evacuation, as substrates 1 and 2 are held under pressure and kept at a predetermined posture, deformation of substrates 1 and 2, distortion or peeling of sealant 3, change in the preset gap or miss-alignment between substrates 1 and 2 as experienced in the conventional methods do not occur, and the air or volatile component existing between substrates I and 2 are satisfactorily exhausted to the outside of cell 4.

After evacuation is completed, the inner temperature of thermostatic chamber 50 is gradually increased while maintaining the state of pressurizing-while-evacuation. With this process, the entire cell 4 is held at a predetermined stable posture, and sealant 3 is satisfactorily cured while a uniform temperature distribution is maintained inside thermostatic chamber 50; this preventy the non-uniform expansion or deterioration of alignment accuracy in each of substrates 1 and 2. Also, as it is possible to raise the temperature of sealant 3 or temporary fixer 6 (FIG. 6) to a temperature at which curing is most efficiently performed without insufficient curing of the sealant 3 and/or temporary fixer 6 remaining soft.

As the curing of sealant 3 is finished, by maintaining the curing temperature for a predetermined period of time, the inner temperature of thermostatic chamber 50 is gradually decreased to room temperature, and then evacuation is ceased and the atmospheric pressure restored. During this process, cell 4 is held under pressure from both sides of substrates 1 and 2 by means of pressure plate 43. Consequently, even as the temperature is decreased or the atmospheric pressure is restored, no deformation of substrates 1 and 2 will be caused due to the difference in modulus of rigidness arising from the difference in the construction of substrates 1 and 2, or to the difference in pressure acting on substrates 1 and 2, thereby preventing any change in the preset gap and/or miss-alignment between substrates 1 and 2.

Finally, the compressed air which has been supplied to the inside of pressurizing chamber 31a is gradually exhausted, thus releasing and ceasing the pressurized state. As the entire flat surfaces of substrates 1 and 2 are gradually released being pressurized, no excessive force is applied to any portion of substrates 1 and 2, again preventing any deformation, change in the preset gap, or miss-alignment between substrates 1 and 2.

It is possible to house a plurality of cells 4 within the thermostatic chamber 50 and to stably cure sealant 3; the plurality of cells 4 can be processed with high efficiency without requiring conventional pressing equipment and with a relatively small-scale low cost equipment, with improved productivity.

In the above-described embodiment, although a flat elastic plate 41 is provided on the bottom surface of upper lid 31 and an elastic holding section to pressurize cell 4 is configured with elastic plate 41 and a pressure plate 43, the elastic holding section is not limited to this configuration, and the elastic holding section maybe configured directly pressurize cell 4 with elastic plate 41 without providing a pressure plate 43.

As has been described above, the present invention, joining a pair of substrates with a sealant interposed, the substrates being held from both sides under pressure and with evacuating of air and volatile components through an opening of the sealant between the substrates while under pressure, and the sealant is cured by heating the entire cell while maintaining these conditions. As a result of evacuating through the opening of the sealant while the substrates are held on both sides under a pressure, it is possible to quickly exhaust the air and volatile component between the substrates to the outside of the cell and satisfactorily cure the sealant without causing any deformation of the substrates, distortion or peeling of the sealant, or change in the preset gap or miss-alignment between the substrates.

In addition during heating, as the temperature of the whole cell is gradually increased in a variable temperature chamber, the whole cell is heated in a stable condition to securely prevent uneven thermal expansion in each substrate, or affect the deterioration of alignment accuracy.

Moreover by laying a cell in a housing unit roughly of a shape of frame of a box and holding and pressurizing the cell with an elastic holding section which expands by air pressure, and by connecting the inside of the housing unit to an evacuation passageway through an exhaust passageway, the sealant is properly cured by relatively small-scale equipment having low cost.

In addition, by configuring the thermostatic chamber in such a way as to store housing units on multiple shelves, it is possible to process a plurality of cells at a time, thus increasing processing capability and productivity.

What is claimed is:

1. A method of manufacturing liquid crystal panels comprising:

providing a sealing member, said sealing member having an opening therein;

joining a pair of substrates at a periphery of opposing upper and lower surfaces of each by interposing said sealing member therebetween to form a cell;

pressurizing at least one of an upper and a lower surface of said cell to hold said cell within a hermetically sealable housing unit;

evacuating said cell through the opening in said sealing member substantially simultaneously with the pressurizing step;

placing the housing unit holding the cell in a thermostatic chamber while maintaining the pressure; and curing said sealing member by heating said hermetically sealable housing unit within the thermostatic chamber.

2. The method of claim 1, wherein the housing unit comprises a box-shaped unit with a movable upper lid for closing the top opening thereof.

3. An apparatus for manufacturing liquid crystal panels comprising:

a box-shaped housing unit;

a movable upper lid that closes the top of said box-shaped housing unit;

a hermetically sealable section located within a portion of said box-shaped housing unit, said hermetically sealable section having a base to receive a cell;

an elastic holding section located opposite the base of said hermetically sealable section for holding a cell between a lower surface of said elastic holding section and an upper surface of the base;

said elastic holding section comprising an elastic plate and a flat pressure plate for applying a pressure on a cell;

pressurization means for providing a downward force on an upper surface of said elastic holding section to secure a cell between the lower surface of said elastic holding section and the upper surface of the base of said hermetically sealable section;

said box-shaped housing unit having an exhaust passageway within said hermetically sealable section; and an evacuation passageway communicating at one of its ends with said exhaust passageway and at its other end with external evacuating means to evacuate gas within a cell.

4. The apparatus for manufacturing liquid crystal panels as defined in claim 3, further comprising a thermostatic chamber to gradually increase and decrease a temperature of said box shaped units housing.

5. The apparatus for manufacturing liquid crystal panels as defined in claim 4, wherein the said thermostatic chamber has a plurality of shelves to hold a plurality of box-shaped housing units.

* * * * *